US007060191B2

(12) United States Patent
Iwase

(10) Patent No.: US 7,060,191 B2
(45) Date of Patent: Jun. 13, 2006

(54) MAGNET ROLL, METHOD OF MANUFACTURING THE MAGNET ROLL, AND ELECTRONIC EQUIPMENT USING THE MAGNET ROLL

(75) Inventor: Atsushi Iwase, Mie (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 229 days.

(21) Appl. No.: 10/168,204

(22) PCT Filed: Oct. 16, 2001

(86) PCT No.: PCT/JP01/09088

§ 371 (c)(1),
(2), (4) Date: Oct. 3, 2002

(87) PCT Pub. No.: WO02/33712

PCT Pub. Date: Apr. 25, 2002

(65) Prior Publication Data

US 2003/0110632 A1 Jun. 19, 2003

(30) Foreign Application Priority Data

Oct. 19, 2000 (JP) ............................. 2000-319017
Jul. 30, 2001 (JP) ............................. 2000-229206

(51) Int. Cl.
*B32B 1/08* (2006.01)

(52) U.S. Cl. ............................. 216/8; 216/10; 216/41; 29/895.32

(58) Field of Classification Search ................. 216/10, 216/41, 8; 29/895.32
See application file for complete search history.

(56) References Cited

U.S. PATENT DOCUMENTS

| | | | | |
|---|---|---|---|---|
| 4,032,378 | A * | 6/1977 | McDonald et al. | 216/8 |
| 4,116,594 | A * | 9/1978 | Leanna et al. | 425/3 |
| 6,492,009 | B1 * | 12/2002 | Lai | 428/209 |
| 6,537,459 | B1 * | 3/2003 | Dufresne et al. | 216/8 |

FOREIGN PATENT DOCUMENTS

| | | | | |
|---|---|---|---|---|
| JP | 60-142369 | | | 7/1985 |
| JP | 05070011 | A | * | 3/1993 |
| JP | 6-138774 | | | 5/1994 |
| JP | 06-138774 | | * | 5/1994 |
| JP | 8-160736 | | | 6/1996 |
| JP | 09-017716 | A | * | 1/1997 |
| JP | 2000-151098 | | * | 5/2000 |

* cited by examiner

*Primary Examiner*—Shamim Ahmed
(74) *Attorney, Agent, or Firm*—RatnerPrestia

(57) ABSTRACT

A magnet roller includes a rotary sleeve having a given systematic pattern on the outer surface of the sleeve and a magnet provided in the sleeve. This structure transfers toner uniformly along the outer surface of the sleeve. A printer, for instance, employing this magnet roller can print a fine copy.

13 Claims, 8 Drawing Sheets

MAGNET ROLL, METHOD OF MANUFACTURING THE MAGNET ROLL, AND ELECTRONIC EQUIPMENT USING THE MAGNET ROLL

This application is a U.S. National Phase application of PCT International application PCT/JP01/09088.

1. Technical Field

The present invention relates to a magnet roller to be employed in electronic apparatuses such as a copying machine, printer, facsimile, and a method of manufacturing the same magnet roller. It also relates to electronic apparatuses employing the same magnet roller.

2. Background Art

A magnet roller comprises a rotary sleeve and a magnet disposed in the sleeve. On the outer surface of the sleeve, numerous peaks and valleys are formed, and these peaks and valleys contribute to transferring toner. Recently, the market has demanded that the peaks and valleys be more closely formed. To be more specific, a copying machine produces a copy of higher resolution, thus the peaks and valleys more closely formed on the outer surface of the sleeve could enlarge an outer surface area, thereby transferring a greater amount of toner. However, even if the peaks and valleys are formed more closely on the outer surface of the sleeve, it does not directly result in printing a higher resolution copy.

This problem is caused by the following reason. In prior art, peaks and valleys are formed by sand blasting. When the peaks and valleys formed by the sand blasting are required to be more closely formed, a processing time of the sand blasting should be prolonged or a stronger injection pressure should be used by the sand blasting. However, if the process time is prolonged or the stronger injection pressure is applied, it could curve the sleeve per se. Although peaks and valleys are formed more closely on the outer surface of the sleeve, the curved sleeve prevents the copying machine from printing a copy of higher resolution.

SUMMARY OF THE INVENTION

The present invention addresses the problem discussed above and aims to provide a magnet roller which allows the apparatus employing the magnet roller to print a copy of higher resolution, a method of manufacturing the same magnet roller and electronic apparatuses using the same magnet roller.

The magnet roller of the present invention comprises a rotary sleeve and a magnet disposed in the sleeve. On the outer surface of the sleeve, a given systematic pattern is formed. Since the predetermined systematic pattern is formed, toner can be transferred uniformly along the outer surface of the sleeve, so that a copy of higher resolution can be printed.

The method of manufacturing the magnet roller of the present invention includes a step of forming a predetermined systematic pattern by etching or laser processing on the outer surface of the rotary sleeve. This step is carried out during the manufacturing of the magnet roller which includes the rotary sleeve and the magnet disposed in the sleeve. This method allows to form a predetermined systematic pattern with ease on the outer surface of the sleeve.

The electronic apparatuses of the present invention include the magnet roller that transfers fluid or powder. The magnet roller comprises the rotary sleeve and the magnet disposed in the sleeve, and a predetermined systematic pattern is formed on the outer surface of the sleeve. This structure allows the apparatuses to transfer fluid or powder appropriately, thereby printing a copy of higher resolution.

PREFERRED EMBODIMENTS OF THE INVENTION

Exemplary embodiments of the present invention are demonstrated hereinafter with reference to the accompanying drawings.

First Exemplary Embodiments

Figure 1:
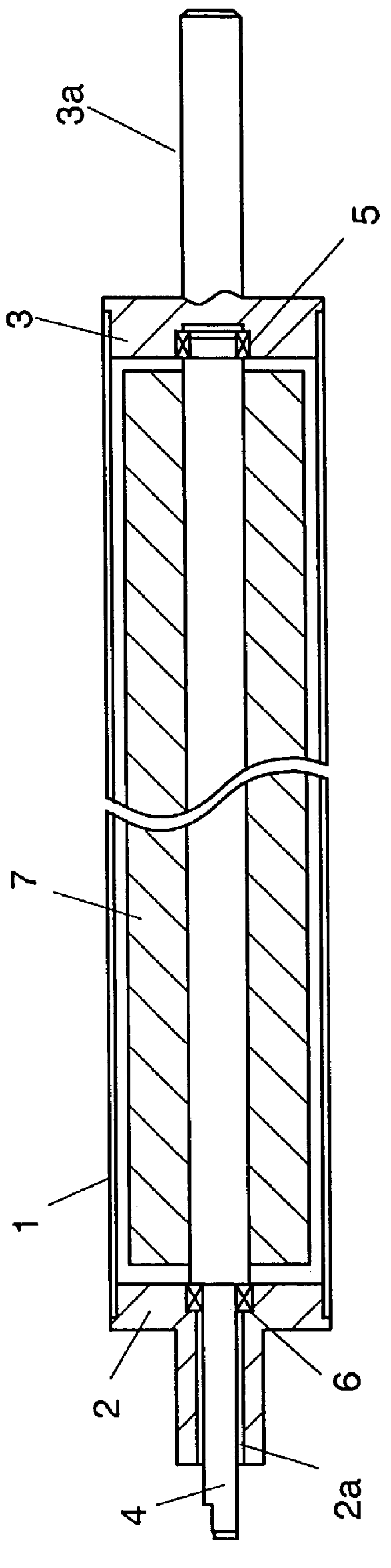
FIG. 1 is a sectional view of a magnet roller in accordance with a first exemplary embodiment of the present invention.
Figure 2:
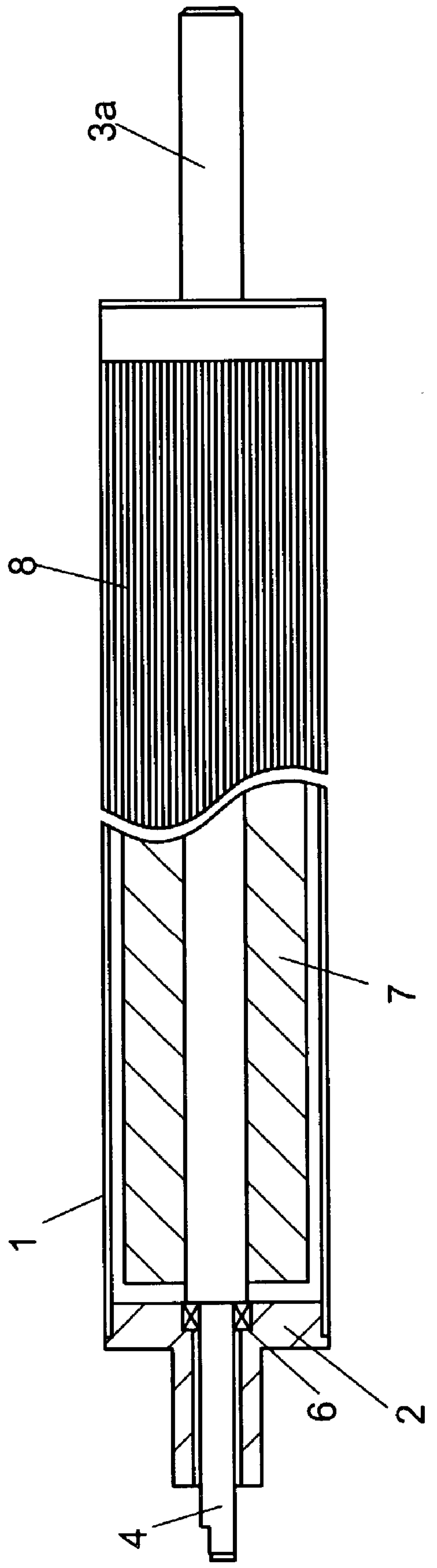
FIG. 2 is a partial sectional view of a front view of the magnet roller in accordance with the first embodiment.

FIG. 1 is a sectional view of a magnet roller in accordance with the first exemplary embodiment of the present invention, and FIG. 2 is a partial sectional view of a front view of the magnet roller. In FIG. 1, cylindrical sleeve 1 is made of aluminum or stainless steel. Both ends of sleeve 1 are open, and flange 2, 3 are fixed to the respective openings. Shaft 4 extends through through-hole 2*a* of flange 2. The right-side end of shaft 4 is supported by bearing 5 inside flange 3. Shaft 4 is also supported by bearing 6 inside flange 2.

On the outer surface of shaft 4 housed in sleeve 1, magnet 7 is rigidly mounted. In an electronic apparatus such as a copying machine, shaft 3*a* of flange 3 is rotated with shaft 4 being fixed. This rotation entails sleeve 1 fixed to flange 3 to rotate. In other words, with shaft 4 being fixed, sleeve 1 is rotatable.

Figure 3:
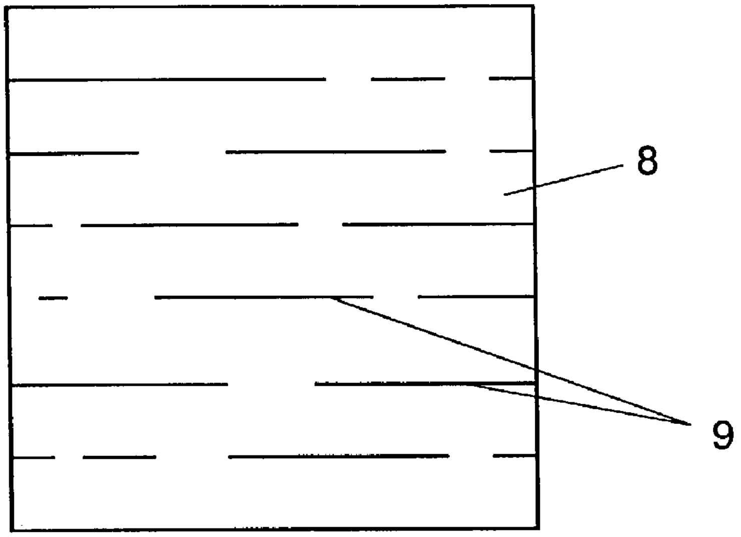
FIG. 3 is an enlarged front view of the sleeve of the magnet roller shown in FIG. 2.

Next, sleeve 1 is detailed. As shown in FIG. 2, predetermined systematic pattern 8 is formed on the outer surface of sleeve 1. Several examples of pattern 8 are shown in FIG. 3 through FIG. 8. Pattern 8 shown in FIG. 3 is formed of aggregate of a plurality of linear recesses 9, in other words, linear recesses 9 are systematically arranged. Since such kind of systematic pattern 8 is formed on the outer surface of sleeve 1, recesses 9 are clogged with toner, and the toner is thus transferred when sleeve 1 rotates.

Linear recesses 9 are suitable for being formed by etching or laser, which can form recesses 9 keeping a regular pattern with an enough depth. The toner thus can be definitely transferred. Meanwhile, when a greater amount of toner needs to be transferred, a number of recesses 9 should be increased or the depth of recesses 9 should be deepened. Therefore, a manufacturer of this magnet roller prepares a plurality of patterns differing in number, placement, depth of recesses 9, so that the manufacturer selects one of the patterns upon request from a user and then forms the pattern by etching or laser on sleeve 1.

Figure 4:
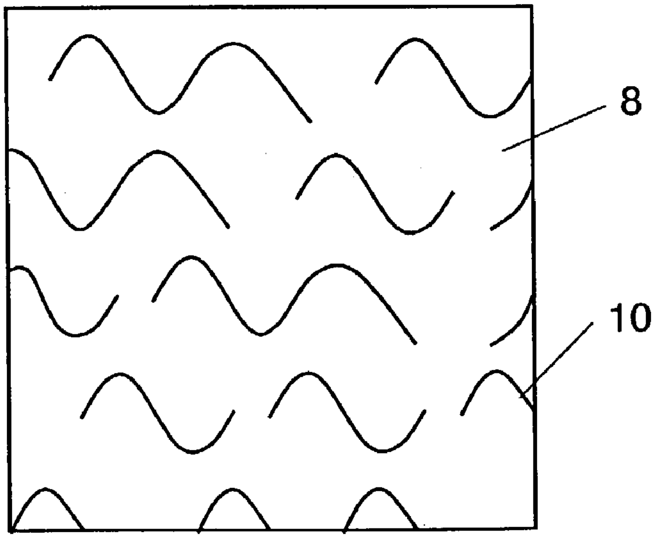
FIG. 4 is an enlarged front view of a sleeve of a magnet roller in accordance with another embodiment of the present invention.
Figure 5:
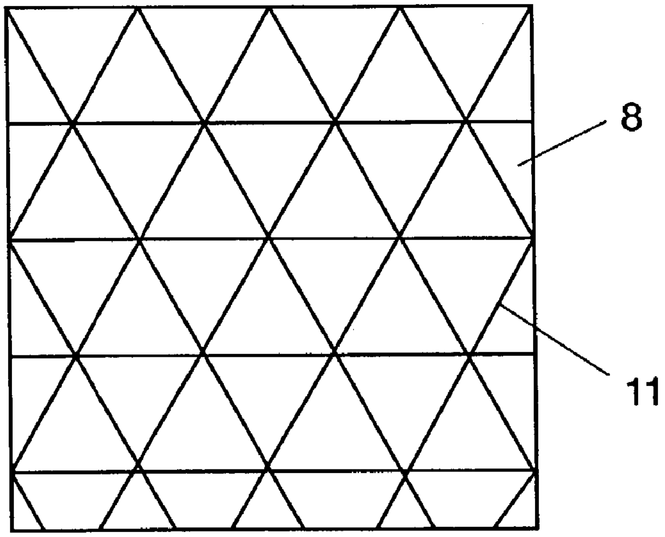
FIG. 5 is an enlarged front view of a sleeve of a magnet roller in accordance with still another embodiment of the present invention.
Figure 6:
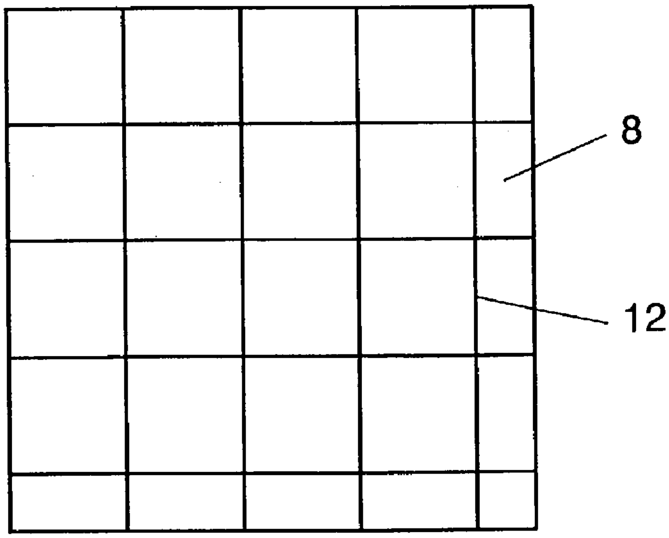
FIG. 6 is an enlarged front view of a sleeve of a magnet roller in accordance with further another embodiment of the present invention.
Figure 7:
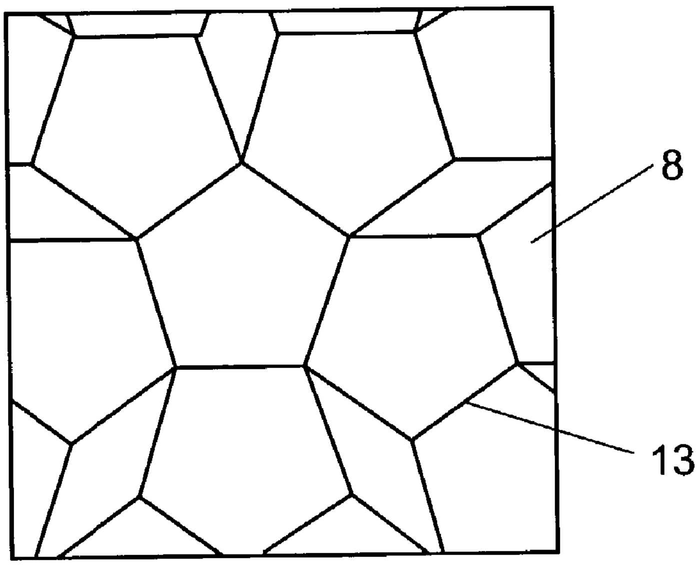
FIG. 7 is an enlarged front view of a sleeve of a magnet roller in accordance with still further another embodiment of the present invention.
Figure 8:
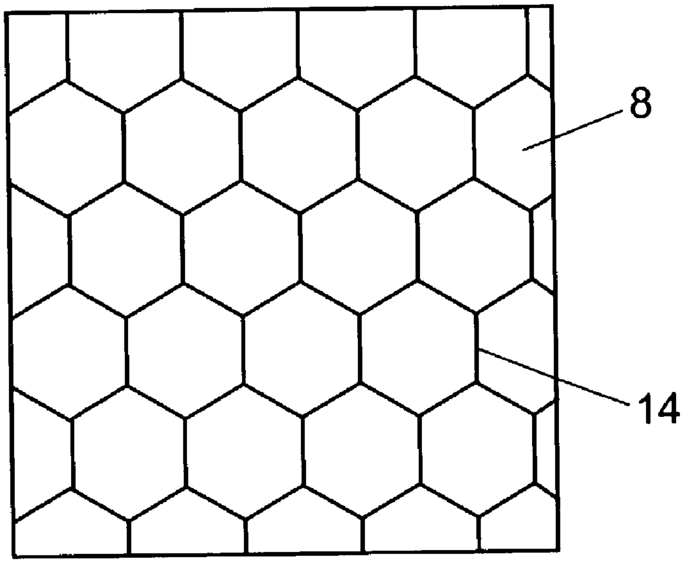
FIG. 8 is an enlarged front view of a sleeve of a magnet roller in accordance with another embodiment of the present invention.

Pattern 8 shown in FIG. 4 is formed of aggregate of a plurality of curved recesses 10. Pattern 8 shown in FIG. 5 is formed of aggregate of a plurality of recesses outlining a triangular shape 11. Pattern 8 shown in FIG. 6 is formed of aggregate of a plurality of recesses outlining quadrangle shape 12. Pattern 8 shown in FIG. 7 is formed of aggregate of a plurality of recesses outlining pentagonal shape 13. Pattern 8 shown in FIG. 8 is formed of aggregate of a plurality of recesses outlining hexagonal shape 14. As such, a predetermined systematic pattern is formed on the outer surface of the sleeve.

A manufacturer of the magnet roller prepares various patterns, e.g., the patterns shown in FIG. 3 through FIG. 8, and selects one of them upon request from a user. Then the selected pattern is formed on the sleeve. Thus an amount of toner requested by the user can be transferred uniformly and adequately. As a result, the magnet roller that prints a copy of higher resolution can be provided.

Second Exemplary Embodiment

Figure 9:
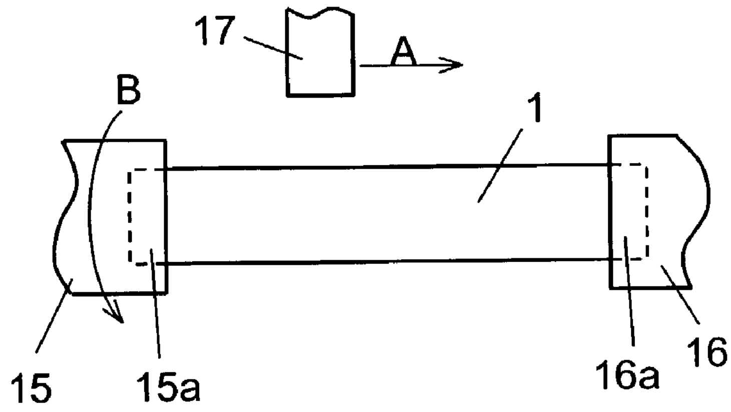
FIGS. 9 and 10 are front views illustrating a method of manufacturing a magnet roller in accordance with a second exemplary embodiment of the present invention.

FIG. 9 illustrates a method of manufacturing a magnet roller in accordance with the second exemplary embodiment of the present invention, more particularly it illustrates a method of manufacturing sleeve 1 of the magnet roller. To be more specific, various patterns 8 shown in FIG. 3 through FIG. 8 can be formed, for instance, by the method illustrated in FIG. 9.

The method is detailed hereinafter. As shown in FIG. 9, both the ends of sleeve 1 are held by holders 15, 16. Recessed holding sections 15*a*, 16*a* are provided on the faces of holders 15, 16 opposite to each other, and sleeve 1 is inserted into holding sections 15*a*, 16*a*, so that sleeve 1 is held. In other words, recesses are not formed on both the ends inserted in holding sections 15*a*, 16*a* in the step of forming pattern 8. Both the ends thus do not have recesses, so that toner neither attaches to the ends nor overflows advantageously from both sides of sleeve 1.

Next, with sleeve held by holders 15 and 16, nozzle 17 ejects resist to the outer surface of sleeve 1, moving along arrow-mark A as shown in FIG. 9. Then with nozzle 17 located on the right hand side of sleeve 1, holders 15 and 16 rotate by a given angle along arrow-mark B shown in FIG. 9, e.g., by 10 degrees. When the rotated angle is not more than 10 degrees, though an outer diameter of sleeve 1 somewhat affects, the resist attaches to the outer surface correctly within an area of 10 degrees even if the surface forms a cylinder. This mechanism is similar to the mechanism of printers, i.e., when a printer prints an image, an exact image can be reproduced even the drum has a curved surface.

Then in the condition where sleeve 1 rotates by 10 degrees, nozzle 17 located on the right side as shown in FIG. 9 moves toward the opposite side to arrow-mark A attaching resist to the outer surface at an area of 10 degrees rotated. As such, holders 15, 16 are rotated 360 degrees at the intervals of 10 degrees, thereby attaching resist to the outer surface of sleeve 1. This resist attaches to the areas of patterns 8 shown in FIG. 3 through FIG. 8 except recesses 9 through 14 of respective patterns 8. In other words, resist does not attach to the recesses which form patterns 8.

To be more specific, the sections of any pattern 8 shown in FIG. 3 through FIG. 8, where no resist attaches, are etched with etching solution, whereby any one of recesses 9 through recesses 14 are formed. In other words, in FIG. 9, resist attaches to the area except recesses 9 of pattern 8 shown in FIG. 3 as discussed above. In the same manner, resist attaches to the area except recesses 10 of pattern 8 shown in FIG. 4, resist attaches to the area except recesses 11 of pattern 8 shown in FIG. 5, resist attaches to the area except recesses 12 of pattern 8 shown in FIG. 6, resist attaches to the area except recesses 13 of pattern 8 shown in FIG. 7, and resist attaches to the area except recesses 14 of pattern 8 shown in FIG. 8.

Figure 10:
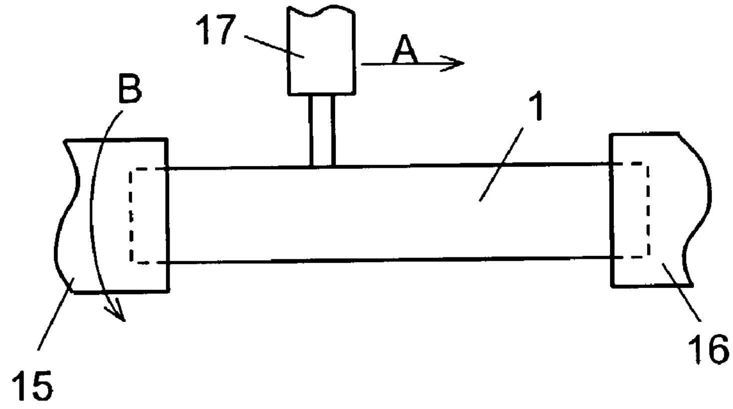

FIG. 10 illustrates another method of manufacturing the sleeve. According to this method, holders 15, 16 firstly rotate 360 degrees along arrow-mark B. At this time, nozzle 17 stops at a place, and from there, attaches resist onto the outer surface of sleeve 1. When the holders have rotated 360 degrees, nozzle 17 moves a given distance along arrow-mark A shown in FIG. 10. Then holders 15, 16 rotate again 360 degrees along arrow-mark B. As such, resist attaches to the outer surface of sleeve 1 as if sleeve 1 were cut into thin round slices. This method can also attach resist with ease to the sleeve for forming one of patterns 8 shown in FIG. 3 through FIG. 8.

Figure 11:
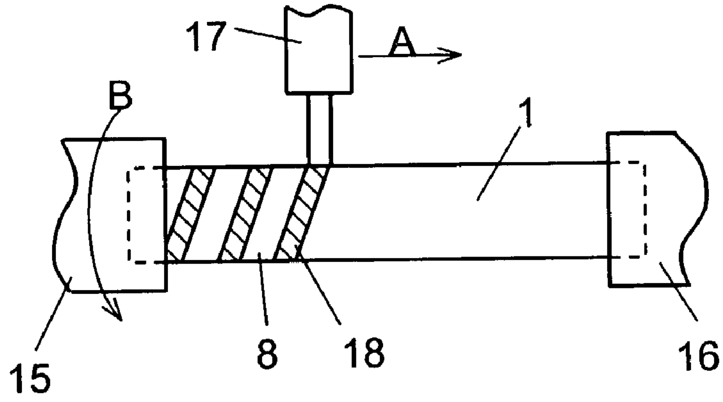
FIG. 11 is a front view illustrating another embodiment of the method of manufacturing a magnet roller of the present invention.

FIG. 11 illustrates still another method which forms a continuous spiral recess, which is different from the recesses shown in FIG. 3 through FIG. 8, on the outer surface of sleeve 1. This pattern allows the magnet roller to move toner continuously, for instance, from left to right, for supplying. Spiral pattern 8 shown in FIG. 11 is formed by the following method.

First, nozzle 17 moves continuously along arrow-mark A with sleeve 1 rotating along arrow-mark B shown in FIG. 11, so that resist 18 attaches to sleeve 1 for drawing a spiral pattern. After this, etching is provided, so that recesses are formed at the places where no resist attaches. As a result, pattern 8 of a continuous spiral recess is completed.

Figure 12:
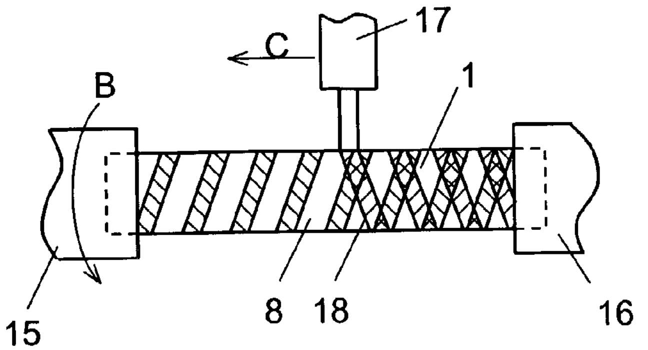
FIG. 12 is a front view illustrating still another embodiment of the method of manufacturing a magnet roller of the present invention.

FIG. 12 illustrates further another method which forms a pattern in which spiral patterns are crossed each other from both sides. In this case, firstly, attach resist 18 to sleeve 1 as shown in FIG. 11, then move nozzle 17 along arrow-mark C opposite to arrow-mark A in FIG. 11 with holders 15, 16 rotating along arrow-mark B continuously. Resist is thus attached to the outer surface of sleeve 1 before etching is carried out. As a result, pattern 8 of spiral recesses crossed each other from both sides is formed on the outer surface of sleeve 1.

Figure 13:
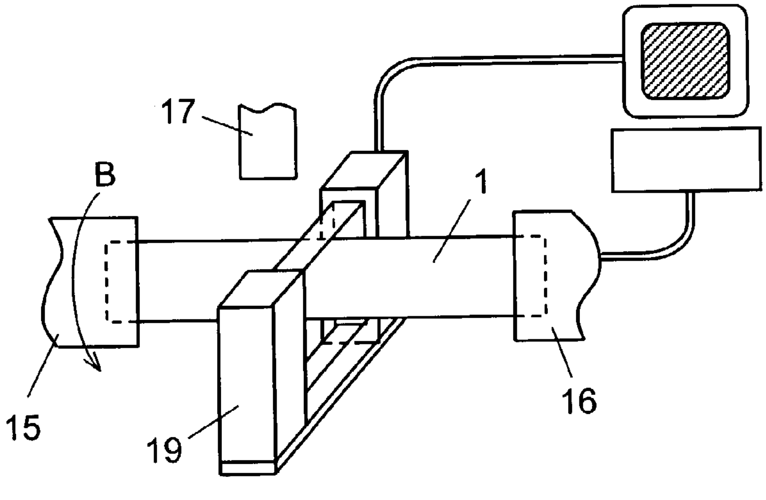
FIG. 13 is a perspective view illustrating further another embodiment of the method of manufacturing a magnet roller of the present invention.

FIG. 13 illustrates a method of attaching resist 18 correctly to the outer surface of sleeve 1 shown in FIG. 9 through FIG. 12. Sleeve 1 does not always have an even outer diameter longitudinally. When resist 18 attaches to such a sleeve continuously as shown in FIG. 9 through FIG.

12, there happens inconvenience in the continuity of resist patterns due to the presence of sections having a greater diameter and a smaller diameter. To be more specific, a resist pattern is broken or becomes thick at some places. To avoid this inconvenience, the method shown in FIG. 13 uses laser measuring instrument 19 for measuring the outer diameter of sleeve 1 in advance. Then nozzle 17 ejects resist based on the measurement. This method can prevent the continuity of the resist patterns from being broken or the resist from being overlaid due to the difference in outer diameter in the longitudinal direction. When any ones of recesses 9 through recesses 14 are formed by laser, the outer diameter of the sleeve is measured in advance with laser measuring instrument 19. Then laser process is carried out based on the measurement, so that better recesses can be formed.

Third Exemplary Embodiment

Figure 14:
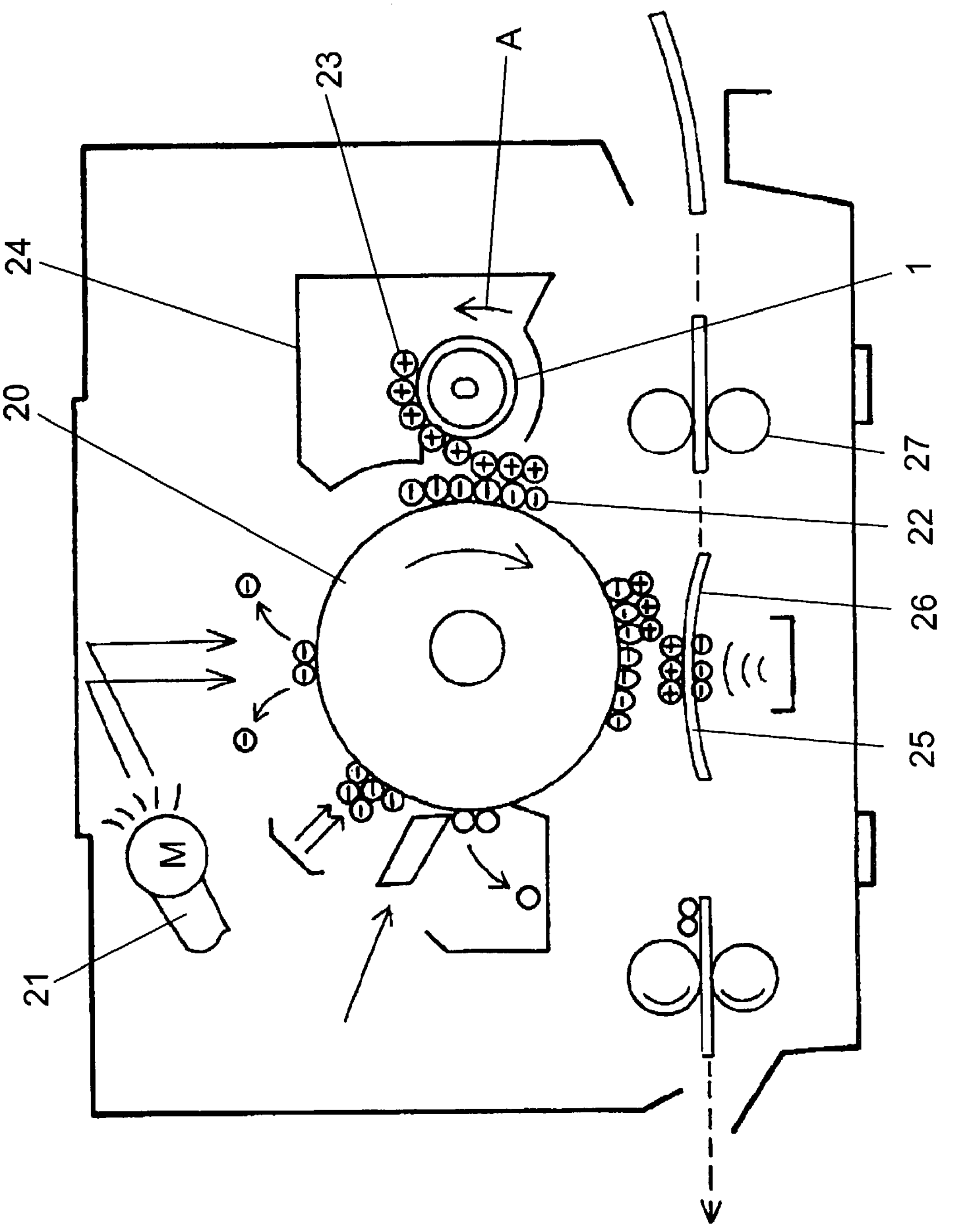
FIG. 14 is a sectional view of an electronic apparatus in accordance with a third exemplary embodiment of the present invention.

FIG. 14 is a sectional view of a printer as an example of electronic apparatuses in accordance with the third embodiment. This printer includes the sleeve, on which one of the patterns shown in FIG. 3 through FIG. 8, FIG. 11 and FIG. 12 is formed.

This printer does not so much differ from conventional ones, thus the description thereof is simply made. In FIG. 14, laser generator 21 outputs laser responsive to image information, and the laser reproduces the image information on the outer surface of photo conductor drum 20. On the reproduced image, toner 23 is attached by developer 22. In actual, container 24 of developer 22 contains toner 23, and sleeve 1 rotates along arrow-mark A to transfer toner 23. Toner 23 is transferred according to a predetermined systematic pattern 8 shown in one of FIG. 3 through FIG. 8, FIG. 11 or FIG. 12.

To be more specific, the toner is accommodated in the recesses of pattern 8, so that the toner is transferred, and the toner attaches only to the image reproduced on photo conductor drum 20. At printing section 25, the attached toner is transcribed onto paper 26 (an example of print media) transferred by transferring means 27.

In the present invention, as discussed above, one of the predetermined systematic patterns as shown in FIG. 3 through FIG. 8, FIG. 11 and FIG. 12, i.e., an adequately calculated number of recesses per unit area, is formed on the outer surface of sleeve 1. The toner is accommodated in the recesses, and transcribed onto paper 26. Therefore, an image can be copied at printing section 25 properly onto paper 26 without unevenness.

As discussed above, the present invention provides a predetermined systematic pattern on an outer surface of a sleeve, so that the full circumference of the outer surface can transfer toner uniformly. As a result, a fine copy is obtainable.

The previous embodiments refer to powder such as toner to be transferred by the magnet roller; however, fluid such as ink can be transferred by the magnet roller of the present invention with a similar advantage to that of the previous embodiments.

INDUSTRIAL APPLICABILITY

The magnet roller of the present invention comprises a rotary sleeve, which includes a given systematic pattern formed on its outer surface, and a magnet disposed in the sleeve. Since the predetermined systematic pattern is formed on the outer surface of the sleeve, toner can be transferred uniformly along the outer surface of the sleeve. As a result, a printer, for instance, including the magnet roller of the present invention, can produce a fine copy.

The invention claimed is:

1. A method of manufacturing a magnet roller, the magnet roller comprising:
   - a rotary sleeve including a predetermined pattern having a predetermined number of recesses per unit area formed on an outer surface of the sleeve; and
   - a magnet disposed in the sleeve,
   - wherein the method comprises the steps of:
   - (a) depositing resist to the outer surface of the sleeve by printing, said resist prevented from being deposited on portions of said sleeve while, on other portions of said sleeve, said resist is deposited so that said predetermined pattern is formed; and
   - (b) performing etching to the outer surface for forming the predetermined pattern on sections where no resist is printed as recesses in the rotary sleeve;
   - (c) ejecting the resist from a nozzle to the outer surface of the sleeve in a manner corresponding to a shape of the pattern, so that the resist attaches to the outer surface of the sleeve for forming a predetermined shape,
   - wherein the elected resist attaches to a first portion of the outer surface of the sleeve;
   - (d) rotating the sleeve by a predetermined angle;
   - (e) ejecting the resist from the nozzle for attaching the resist to another portion of the outer surface of the sleeve;
   - (f) rotating the sleeve by the predetermined angle; and
   - (g) repeating steps (e) and (f) for attaching the resist to other portions of the outer surface of the sleeve for drawing the predetermined shape with the resist.

2. The method of manufacturing a magnet roller of claim 1, wherein the pattern is formed of aggregate of a plurality of linear recesses.

3. The method of manufacturing a magnet roller of claim 1, wherein the pattern is formed of aggregate of a plurality of curved recesses.

4. The method of manufacturing a magnet roller of claim 1, wherein the pattern is formed of aggregate of a plurality of recesses outlining at least one of triangular, quadrangular, pentagonal, and hexagonal shapes.

5. The method of manufacturing a magnet roller of claim 1 comprising the steps of:
   - forming a plurality of the patterns by etching;
   - selecting one pattern from the patterns; and
   - forming the selected pattern on the sleeve.

6. The method of manufacturing a magnet roller of claim 1, wherein both ends of the sleeve are held by holders, and
   - wherein the resist attaches to the outer surface of the sleeve from the nozzle with the sleeve being rotated by the holders.

7. The method of manufacturing a magnet roller of claim 6, wherein both the ends of the sleeve are held being inserted into respective holding sections of the holders.

8. The method of manufacturing a magnet roller of claim 1, wherein an outer diameter of the sleeve is measured in advance, and the resist attaches to the outer surface of the sleeve from the nozzle based on the measurement.

9. The method of manufacturing a magnet roller of claim 1 comprising the steps of:
   - ejecting the resist from the nozzle for attaching the resist to the outer surface of the sleeve with the nozzle moving from a first end to a second end along a longitudinal direction of the sleeve; then
   - rotating the sleeve by a predetermined angle, and ejecting the resist from the nozzle for attaching the resist to the outer surface of the sleeve with the nozzle moving from the second end to the first end; then rotating the sleeve by the predetermined angle; and repeating these steps for attaching the resist to the outer surface of the sleeve for drawing a predetermined shape with the resist.

10. The method of manufacturing a magnet roller of claim 9, wherein the predetermined angle is not more than 10 degrees.

11. The method of manufacturing a magnet roller of claim 1 comprising the steps of:

ejecting the resist from the nozzle and attaching the resist to the outer surface of the sleeve with the nozzle being fixed and with the sleeve rotating 360 degrees; then moving the nozzle by a predetermined distance with the nozzle being fixed; then ejecting the resist from the nozzle and attaching the resist to the outer surface of the sleeve with the nozzle being fixed and with the sleeve rotating 360 degrees;

repeating these steps for attaching the resist to the outer surface of the sleeve for drawing a predetermined shape with the resist.

12. The method of manufacturing a magnet roller of claim 1, wherein the nozzle is moved from a first end to a second end along a longitudinal direction of the sleeve with the sleeve rotating continuously, and at a same time, the nozzle ejects the resist for attaching the resist to the outer surface of the sleeve to draw a continuous spiral shape with the resist.

13. The method of manufacturing a magnet roller of claim 1, wherein the nozzle is further moved from the second end to the first end along a longitudinal direction of the sleeve with the sleeve rotating continuously, and at a same time, the nozzle ejects the resist for attaching the resist to the outer surface of the sleeve to draw two continuous spiral shapes crossing each other.

* * * * *